United States Patent
Yamaue et al.

(10) Patent No.: US 11,296,334 B2
(45) Date of Patent: Apr. 5, 2022

(54) FUEL CELL SYSTEM

(71) Applicant: TOYOTA JIDOSHA KABUSHIKI KAISHA, Toyota (JP)

(72) Inventors: Keita Yamaue, Nisshin (JP); Shigeki Hasegawa, Toyota (JP); Hiroyuki Imanishi, Toyota (JP); Tomotaka Ishikawa, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 17 days.

(21) Appl. No.: 16/382,285

(22) Filed: Apr. 12, 2019

(65) Prior Publication Data

US 2019/0363376 A1 Nov. 28, 2019

(30) Foreign Application Priority Data

May 24, 2018 (JP) .............................. JP2018-099936

(51) Int. Cl.
| | |
|---|---|
| *H01M 8/04029* | (2016.01) |
| *H01M 8/0438* | (2016.01) |
| *H01M 8/04746* | (2016.01) |
| *H01M 8/24* | (2016.01) |
| *F16K 11/085* | (2006.01) |
| *H01M 8/10* | (2016.01) |

(52) U.S. Cl.
CPC ....... *H01M 8/04029* (2013.01); *F16K 11/085* (2013.01); *H01M 8/04417* (2013.01); *H01M 8/04768* (2013.01); *H01M 8/24* (2013.01); *H01M 2008/1095* (2013.01)

(58) Field of Classification Search
CPC ......... H01M 8/04029; H01M 8/04417; H01M 8/04768; H01M 8/24; H01M 2008/1095
See application file for complete search history.

(56) References Cited

U.S. PATENT DOCUMENTS

| | | | |
|---|---|---|---|
| 2002/0037447 A1* | 3/2002 | Imaseki ............ | H01M 8/04723 429/429 |
| 2002/0053216 A1* | 5/2002 | Ap ........................ | B60K 11/02 62/323.1 |

(Continued)

FOREIGN PATENT DOCUMENTS

| | | |
|---|---|---|
| DE | 102015117764 A1 | 5/2016 |
| DE | 112015003129 T5 | 3/2017 |

(Continued)

*Primary Examiner* — Osei K Amponsah
(74) *Attorney, Agent, or Firm* — Oliff PLC

(57) ABSTRACT

An FC (fuel cell) system includes: an FC; a radiator configured to cool a CL (cooling liquid); an ion exchanger provided in a BFP (bypass flow path) branched off from a CFP (circulation flow path) for allowing the CL to circulate between the FC and the radiator; a multi-way valve provided in a branching point at which the BFP is branched off from the CFP; and a pump which circulates the CL. A percentage of the CL that is made to flow through the BFP can be controlled by the multi-way valve. In a case in which a stop time is longer than a threshold time when the FC system is started up, after the CL is circulated through the radiator, the CL is circulated through the BFP at the percentage of 80% or more until electrical conductivity of the CL becomes smaller than a threshold electrical conductivity.

2 Claims, 4 Drawing Sheets

(56) References Cited

U.S. PATENT DOCUMENTS

| | | | |
|---|---|---|---|
| 2010/0068574 A1* | 3/2010 | Naganuma | H01M 8/04395 |
| | | | 429/423 |
| 2016/0129808 A1* | 5/2016 | Bono | H01M 8/04358 |
| | | | 429/435 |
| 2017/0133696 A1 | 5/2017 | Komatsubara et al. | |

FOREIGN PATENT DOCUMENTS

| JP | 2004-311055 A | 11/2004 |
|---|---|---|
| JP | 2010-140658 A | 6/2010 |
| JP | 2014-157832 A | 8/2014 |

\* cited by examiner

FUEL CELL SYSTEM

CROSS REFERENCE TO RELATED APPLICATIONS

This application is based upon and claims the benefit of priority from Japanese patent application No. 2018-099936, filed on May 24, 2018, the disclosure of which is incorporated herein in its entirety by reference.

BACKGROUND

The present disclosure relates to a fuel cell system.

In recent years, solid polymer electrolyte type fuel cells have been focused on as fuel cells for automobiles. A solid polymer electrolyte type fuel cell includes a cell stack in which a number of unit cells are stacked. Each unit cell includes a Membrane/Electrode Assembly (MEA) in which a polymer electrolyte membrane is interposed between a pair of electrodes and a pair of separators between which the MEA is interposed. The fuel cell generates power through an oxidation-reduction reaction of air supplied via the separator on the cathode side and hydrogen gas supplied via the separator on the anode side.

Since the fuel cell generates heat during power generation, the fuel cell is cooled by a cooling liquid that circulates between the fuel cell and a radiator. It is required that the cooling liquid of the fuel cell have electrical insulation from a viewpoint of preventing electric leakage. Therefore, as shown in Japanese Unexamined Patent Application Publication No. 2014-157832, an ion exchanger for removing ions eluted into the cooling liquid from a radiator or the like is provided in a bypass flow path. By removing the ions in the cooling liquid, electrical conductivity of the cooling liquid is reduced. That is, electrical resistivity (the reciprocal of the electrical conductivity) of the cooling liquid increases, and electrical insulation is ensured. In this way, in the fuel cell system, during the power generation in the fuel cell, the ions in the cooling liquid are removed by the ion exchanger while the fuel cell is being cooled.

SUMMARY

The present inventors have found the following problem regarding the fuel cell system.

The radiator is formed of, for example, a metallic fin, a metallic pipe or the like, and a process of manufacturing the radiator includes a brazing process in which a flux is used.

Therefore, when the fuel cell system is stopped for a long period of time at, for example, an early post-manufacturing stage, the flux that remains in the radiator is eluted into the cooling liquid as ions, which may cause the electrical conductivity of the cooling liquid in the radiator to be locally increased.

Therefore, when the fuel cell system is started up after it has been stopped for a long period of time, the cooling liquid that has been stored in the radiator during the stop needs to be guided to the ion exchanger, where ions in the cooling liquid need to be removed in a short period of time, thereby making the electrical conductivity of the cooling liquid lower than a predetermined threshold.

The present disclosure has been made in view of the aforementioned circumstances, and provides a fuel cell system capable of guiding, at the time of start-up after a long-time stop, the cooling liquid that has been stored in the radiator during the stop to the ion exchanger, and removing the ions in the cooling liquid in a short period of time.

A fuel cell system according to the present disclosure is a fuel cell system including:
a fuel cell in which a plurality of cells are stacked;
a radiator configured to cool a cooling liquid that has passed through the fuel cell;
an ion exchanger provided in a bypass flow path branched off from a circulation flow path for allowing the cooling liquid to circulate between the fuel cell and the radiator;
a multi-way valve provided in a branching point at which the bypass flow path is branched off from the circulation flow path; and
a pump which circulates the cooling liquid, wherein
a percentage of the cooling liquid that is made to flow through the bypass flow path can be controlled by the multi-way valve,
in a case in which a stop time is longer than a threshold time when the fuel cell system is started up,
after the cooling liquid is circulated through the radiator,
the cooling liquid is circulated through the bypass flow path at the percentage of 80% or more until electrical conductivity of the cooling liquid becomes smaller than a threshold electrical conductivity.

According to the fuel cell system according to the present disclosure, when the stop time is longer than the threshold time at the time of start-up, after the cooling liquid is circulated through the radiator, the cooling liquid is circulated through the bypass flow path at a percentage of 80% or more until electrical conductivity of the cooling liquid becomes smaller than a threshold electrical conductivity. The cooling liquid that has been stored in the radiator during the stop is mixed with another cooling liquid, the electrical conductivity of the cooling liquid is made uniform, and then this cooling liquid is guided to the ion exchanger, where ions in the cooling liquid can be removed in a short period of time.

When the cooling liquid is circulated through the radiator, the percentage may be set at 0%. It is therefore possible to increase the flow rate of the cooling liquid that flows through the radiator and to mix the cooling liquid that has been stored in the radiator during the stop with another cooling liquid in a short period of time.

When the cooling liquid is circulated through the radiator, the cooling liquid may be circulated halfway through the circulation flow path or more. It is therefore possible to sufficiently mix the cooling liquid that has been stored in the radiator during the stop with another cooling liquid.

The percentage of the cooling liquid when it is circulated through the bypass flow path may be switched in such a way that this percentage in a case in which the fuel cell system is used by a user becomes higher than that in a case in which a pre-shipment test is performed. When the fuel cell system is used by the user, ions in the cooling liquid can be removed in a shorter period of time.

According to the present disclosure, it is possible to provide a fuel cell system capable of guiding, at the time of start-up after a long-time stop, the cooling liquid that has been stored in the radiator during the stop to the ion exchanger, and removing the ions in the cooling liquid in a short period of time.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Hereinafter, specific embodiments of the disclosure will be described in detail with reference to the accompanying drawings. However, the disclosure is not limited to the embodiments. For the purpose of clear explanation, the following description and the drawings are appropriately simplified.

First Embodiment

<Configuration of Fuel Cell System>

Figure 1:
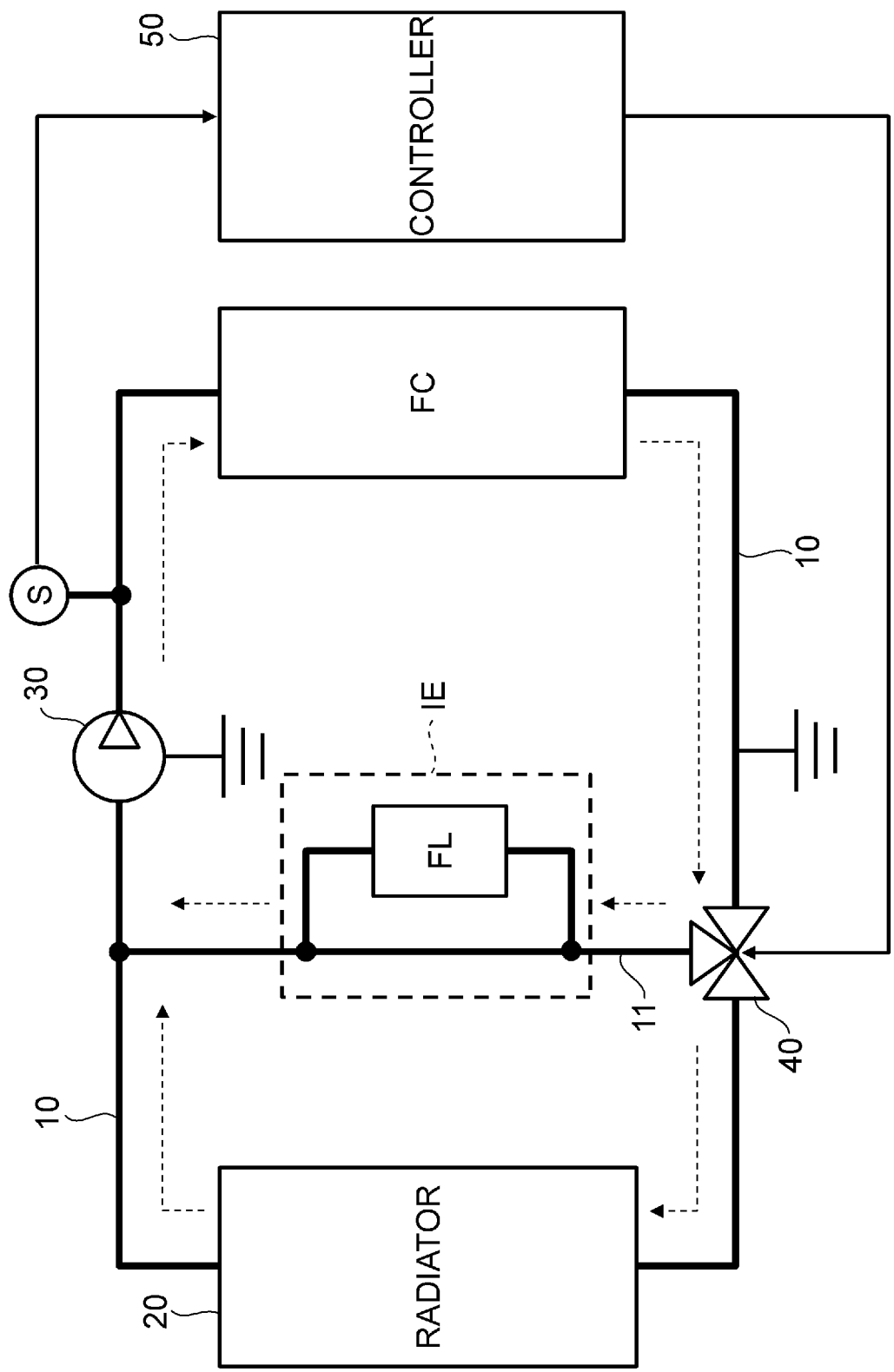
FIG. 1 is a configuration diagram of a fuel cell system according to a first embodiment.

First, with reference to FIG. 1, a configuration of a fuel cell system according to a first embodiment will be explained. FIG. 1 is a configuration diagram of the fuel cell system according to the first embodiment. As shown in FIG. 1, the fuel cell system according to the first embodiment includes a fuel cell FC, an ion exchanger IE, an electrical conductivity sensor S, a circulation flow path 10, a bypass flow path 11, a radiator 20, a cooling liquid pump 30, a multi-way valve 40, and a controller 50. That is, the fuel cell system according to the first embodiment shown in FIG. 1 is a cooling system of the fuel cell FC.

In this embodiment, as one example, a fuel cell system to be applied to a fuel cell automobile will be explained. The fuel cell automobile drives a motor by electricity generated by the fuel cell FC and travels. Note that the fuel cell system according to the first embodiment is not limited to being applied to fuel cell automobiles and may be applied to other applications.

The fuel cell FC, which is a solid polymer electrolyte type fuel cell, includes a cell stack in which a number of unit cells are stacked. Each unit cell includes a Membrane/Electrode Assembly (MEA) in which a polymer electrolyte membrane is interposed between an anode electrode and a cathode electrode and a pair of separators between which the MEA is interposed. The fuel cell FC generates power through an oxidation-reduction reaction of oxygen gas in air supplied via the separator on the cathode side and hydrogen gas supplied via the separator on the anode side.

Specifically, the oxidation reaction shown in Expression (1) occurs in the anode electrode, and the reduction reaction shown in Expression (2) occurs in the cathode electrode. Further, the chemical reaction shown in Expression (3) occurs in the entire fuel cell FC.

$$H_2 \rightarrow 2H^+ + 2e^- \quad (1)$$

$$(\tfrac{1}{2})O_2 + 2H^+ + 2e^- \rightarrow H_2O \quad (2)$$

$$H_2 + (\tfrac{1}{2})O_2 \rightarrow H_2O \quad (3)$$

The fuel cell FC generates heat during power generation by the aforementioned reaction. Therefore, as shown in FIG. 1, the fuel cell FC is connected to the circulation flow path 10, is cooled by a cooling liquid that circulates through the circulation flow path 10, and is maintained to an appropriate temperature.

The circulation flow path 10 is a loop-like flow path for allowing the cooling liquid to circulate between the fuel cell FC and the radiator 20, and is formed of, for example, a rubber pipe, a metallic pipe, a resin pipe or the like. In FIG. 1, the broken arrows drawn along the circulation flow path 10 show the flow of the cooling liquid. Further, as shown in FIG. 1, the circulation flow path 10 is electrically grounded on a cooling liquid outflow side of the fuel cell FC. A metallic pipe is used in the grounding point.

The radiator 20, which is a heat radiator configured to cool the cooling liquid that has passed through the fuel cell FC and thus has been heated, is connected to the circulation flow path 10. The radiator 20 is formed of, for example, a metallic fin for promoting heat radiation and a metallic pipe through which the cooling liquid flows. The metallic fin and the metallic tube are made of, for example, aluminum alloy, copper or the like having high thermal conductivity. The heat of the cooling liquid is discharged to the air by thermal conduction via the metallic tube and the metallic fin.

The radiator 20 may be formed of, for example, a plurality of radiators such as a main radiator and a sub radiator.

The cooling liquid pump 30, which is a pump that circulates the cooling liquid, is provided in the circulation flow path 10. In the example shown in FIG. 1, the cooling liquid pump 30 is provided in the circulation flow path 10 on the cooling liquid inflow side of the fuel cell FC. In other words, the cooling liquid pump 30 is provided in the circulation flow path 10 between the junction point of the bypass flow path 11 with the circulation flow path 10 and the fuel cell FC. Therefore, the cooling liquid pump 30 sends the cooling liquid that has passed through the radiator 20 or the ion exchanger IE to the fuel cell FC. As shown in FIG. 1, the cooling liquid pump 30 is electrically grounded. In this way, the cooling liquid pump 30 is electrically grounded on the cooling liquid inflow side and the cooling liquid outflow side of the fuel cell FC.

It is required that the cooling liquid that passes through the fuel cell FC have electrical insulation from the viewpoint of preventing electric leakage. Therefore, the electrical conductivity of the cooling liquid between two grounding points between which the fuel cell FC is interposed is measured. In the example shown in FIG. 1, the electrical conductivity sensor S is provided on the circulation flow path 10 between the cooling liquid pump 30 and the fuel cell FC, and the electrical conductivity of the cooling liquid is directly measured. The electrical conductivity of the cooling liquid measured by the electrical conductivity sensor S is input to the controller 50, and is then used to control the multi-way valve 40.

The electrical conductivity sensor S may be installed at a desired place on the bypass flow path 11 and the circulation flow path 10 which is closer to the fuel cell FC than the bypass flow path 11 is (i.e. bypass circulation flow path). Further, the means for detecting the electrical conductivity of the cooling liquid is not limited to the electrical conductivity sensor S that directly measures the electrical conductivity of the cooling liquid. Further, since the electrical conductivity of the cooling liquid is the reciprocal of the electrical resistivity of the cooling liquid, the detection of the electrical resistivity of the cooling liquid is synonymous with the detection of the electrical conductivity of the cooling liquid. That is, the electrical resistivity of the cooling liquid may be detected in place of the electrical conductivity of the cooling liquid.

Further, an insulation resistance value between the two grounding points between which the fuel cell FC is interposed may be detected.

As shown in FIG. 1, the bypass flow path 11 is a flow path that is branched off from the loop-like circulation flow path 10 and is provided in parallel with the radiator 20. The broken arrows drawn along the bypass flow path 11 show the flow of the cooling liquid. As shown in FIG. 1, the cooling liquid that has flowed out from the fuel cell FC and has passed through the bypass flow path 11 is circulated in such a way that this cooling liquid flows into the fuel cell FC without passing through the radiator 20.

The ion exchanger IE for removing ions that are eluted into the cooling liquid from the radiator 20 or the like is provided in the bypass flow path 11. As shown in FIG. 1, the ion exchanger IE includes an ion exchange filter FL. Since the pressure loss due to the ion exchange filter FL is large in the ion exchanger IE, only a part of the cooling liquid that flows through the bypass flow path 11 passes through the ion exchange filter FL. By removing the ions in the cooling liquid using the ion exchanger IE, the electrical conductivity of the cooling liquid is reduced. That is, the electrical resistivity (the reciprocal of the electrical conductivity) of the cooling liquid increases and electrical insulation is ensured.

The multi-way valve 40 is an electromagnetic valve provided in a branching point at which the cooling liquid that has passed through the fuel cell FC is diverted from the circulation flow path 10 to the bypass flow path 11. In the example shown in FIG. 1, the multi-way valve 40 is a three-way valve. By controlling the multi-way valve 40 by the controller 50, the ratio of the cooling liquid that is made to flow through the radiator 20 to the cooling liquid that is made to flow through the bypass flow path 11 (i.e., the ion exchanger IE) can be changed.

The multi-way valve 40 is not limited to the three-way valve.

The controller 50 controls operations of various devices in the fuel cell system. When, for example, power generation in the fuel cell FC is started, the controller 50 controls the multi-way valve 40 based on the temperature of the cooling liquid. That is, the percentage of the cooling liquid that is made to flow through the radiator 20 (i.e., the percentage of the cooling liquid that is made to flow through the bypass flow path 11) is changed by the multi-way valve 40, and the temperature of the cooling liquid is maintained to an appropriate temperature. It is therefore possible to remove ions in the cooling liquid by the ion exchanger IE while cooling the fuel cell FC.

Further, at the time of start-up after a long-time stop, the controller 50 controls the multi-way valve 40 based on the electrical conductivity of the cooling liquid measured by the electrical conductivity sensor S. Specifically, the controller 50 controls the multi-way valve 40 in such a way that, after the cooling liquid is circulated through the radiator 20, the cooling liquid is circulated through the bypass flow path 11 at a percentage of 80% or more until the electrical conductivity of the cooling liquid becomes lower than a threshold electrical conductivity. The details of the control operation by the controller 50 will be explained later.

The controller 50 includes, for example, an operation unit such as a Central Processing Unit (CPU) and a storage unit such as a Random Access Memory (RAM) or a Read Only Memory (ROM) that stores various control programs, data and the like, although these elements are not shown in FIG. 1.

<Control Operation by Controller 50>

Figure 2:
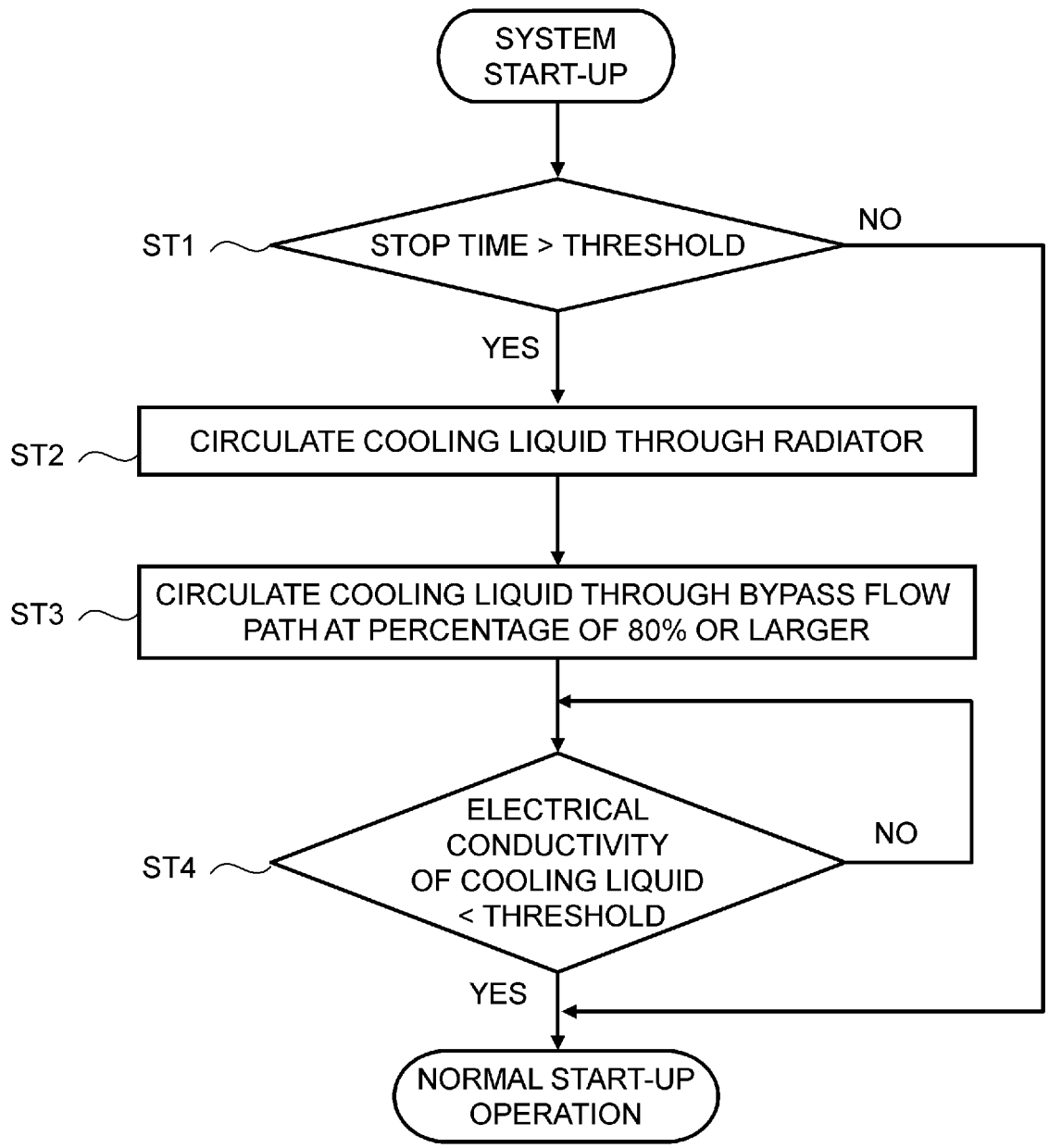
FIG. 2 is a flowchart showing a control operation by a controller 50.

Hereinafter, with reference to FIG. 2, details of the control operation by the controller 50 will be explained. FIG. 2 is a flowchart showing the control operation by the controller 50.

As described above, the radiator 20 is formed of, for example, a metallic fin, a metallic pipe or the like, and a process of manufacturing the radiator 20 includes a brazing process using a flux. Therefore, when the fuel cell system is stopped for a long period of time, for example, at an early post-manufacturing stage, the flux that remains in the radiator 20 is eluted into the cooling liquid as ions. In this case, it is possible that the electrical conductivity of the cooling liquid in the radiator 20 may be locally increased.

In order to address the aforementioned problem, in the fuel cell system according to this embodiment, the controller 50 performs control, at the time of start-up after a long-time stop, in such a way that the cooling liquid that has been stored in the radiator 20 while the fuel cell system has stopped is guided to the ion exchanger IE, and the ions in the cooling liquid are removed in a short period of time.

As shown in FIG. 2, when the system is started up, the controller 50 determines whether the stop time exceeds a threshold time (Step ST1). When the stop time does not exceed the threshold time (NO in Step ST1), there is no possibility that the electrical conductivity of the cooling liquid in the radiator 20 locally increases. In this case, the process goes to the normal start-up operation. The controller 50 calculates, for example, the difference between the time at which the system is started this time and the time at which the system was stopped last time as the stop time.

When the stop time exceeds the threshold time (YES in Step ST1), it is possible that the electrical conductivity of the cooling liquid in the radiator 20 may locally increase. In this case, the cooling liquid is circulated through the radiator 20 (Step ST2). Accordingly, the cooling liquid that has been stored in the radiator 20 while the fuel cell system has stopped is mixed with another cooling liquid, thereby making the electrical conductivity of the cooling liquid uniform.

In Step ST2, as one example, the multi-way valve 40 is controlled in such a way that the rotational speed of the cooling liquid pump 30, that is, the flow rate of the cooling liquid, is made a maximum and the percentage of the cooling liquid that is made to flow through the radiator 20 is made 100% (the percentage of the cooling liquid that is made to flow through the bypass flow path 11 is made 0%). Accordingly, the flow rate of the cooling liquid that flows through the radiator 20 becomes a maximum, whereby it is possible to mix the cooling liquid that has been stored in the radiator 20 while the fuel cell system has stopped with another cooling liquid in a shorter period of time. It can also be expected that the internal part of the radiator 20 will be cleaned.

In Step ST2, as one example, the cooling liquid is circulated halfway through the circulation flow path 10 or more. Accordingly, it is possible to mix the cooling liquid that has been stored in the radiator 20 while the fuel cell system has stopped with another cooling liquid.

Next, the multi-way valve 40 is controlled in such a way that the percentage of the cooling liquid that is made to flow through the bypass flow path 11 is set at 80% or more, and the cooling liquid is circulated through the bypass flow path 11 (Step ST3). The electrical conductivity of the cooling liquid can be reduced in a short period of time by the ion exchanger IE provided in the bypass flow path 11. When the percentage of the cooling liquid that is made to flow through the bypass flow path 11 is smaller than 80%, the ion exchange rate in the ion exchanger IE is reduced and the electrical conductivity of the cooling liquid cannot be reduced in a short period of time.

Figure 3:
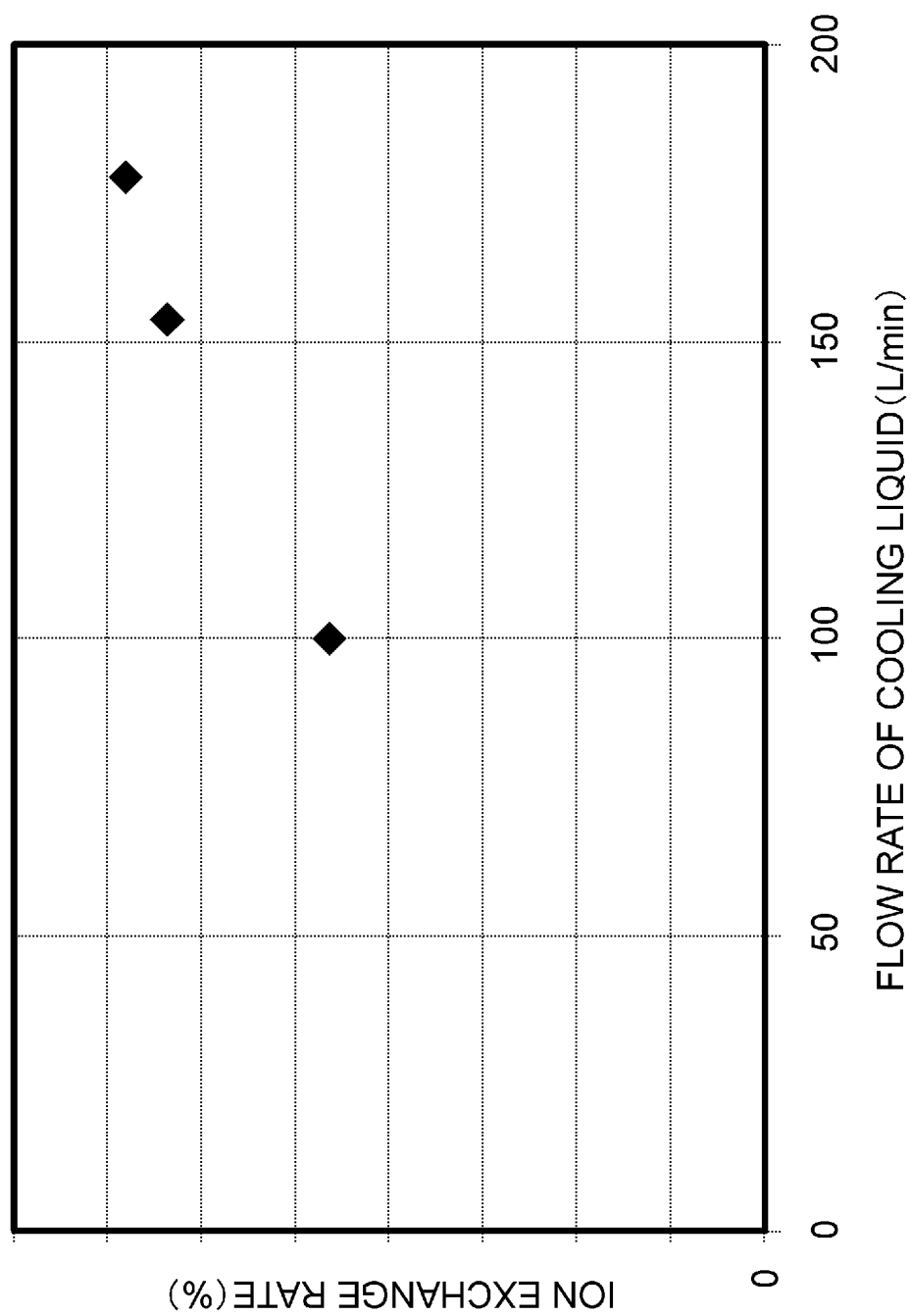
FIG. 3 is a graph showing a relation between a flow rate of a cooling liquid and an ion exchange rate in an ion exchanger IE.

FIG. 3 is a graph showing a relation between the flow rate of the cooling liquid and the ion exchange rate in the ion exchanger IE. In FIG. 3, the horizontal axis indicates the flow rate of the cooling liquid (L/min) and the vertical axis indicates the ion exchange rate (%). As shown in FIG. 3, as the flow rate of the cooling liquid becomes larger, the ion exchange rate becomes higher, and ions can be removed in a short period of time. Normally, the flow rate of the cooling liquid is maintained to be constant (e.g., max). Therefore, as the percentage of the cooling liquid that is made to flow through the bypass flow path 11 becomes larger, ions can be removed in a shorter period of time.

Figure 4:
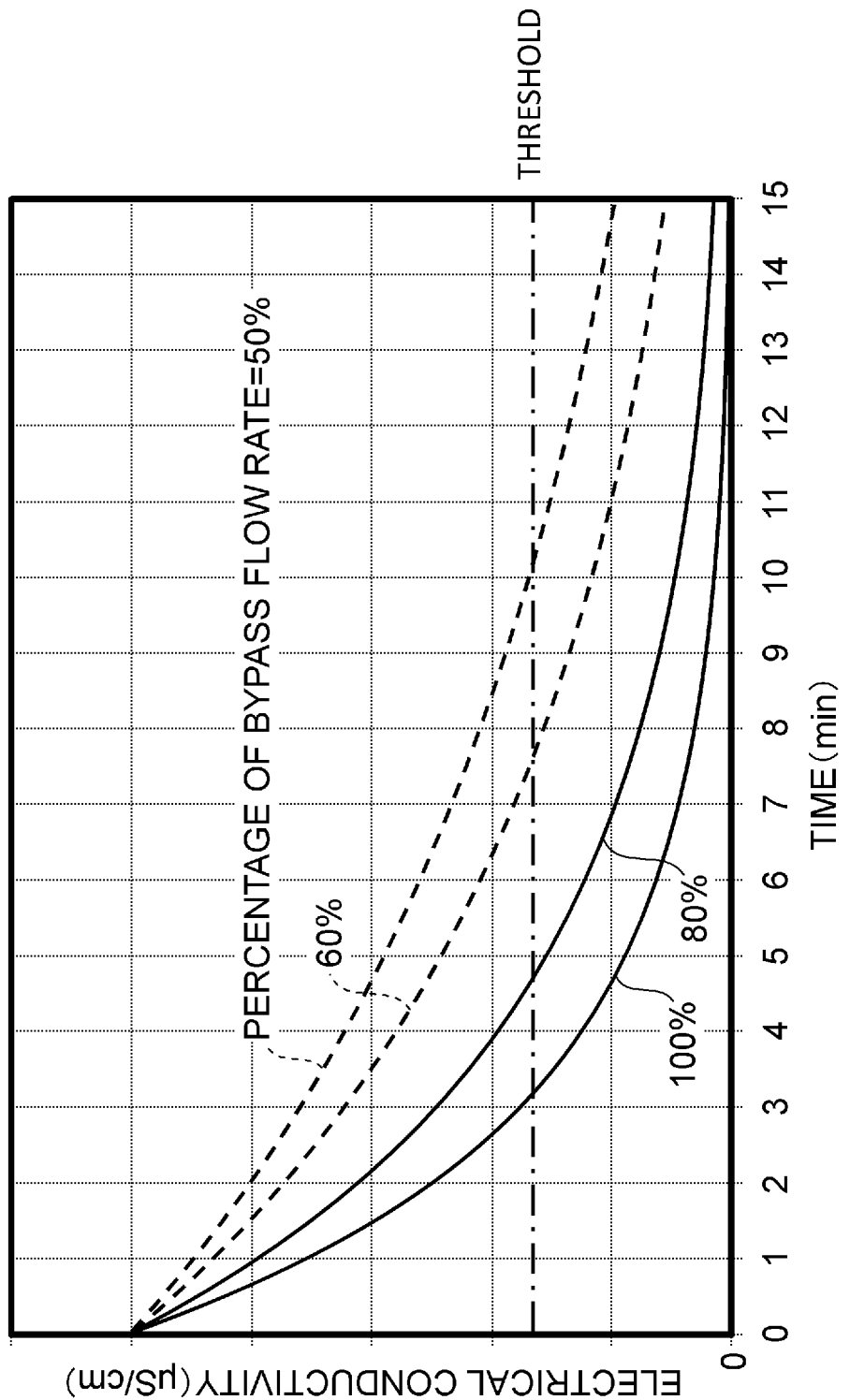
FIG. 4 is a graph showing a temporal change of electrical conductivity when the percentage of the cooling liquid that is made to flow through a bypass flow path 11 is changed.

FIG. 4 is a graph showing a temporal change of the electrical conductivity when the percentage of the cooling liquid that is made to flow through the bypass flow path 11 is changed. In FIG. 4, the horizontal axis indicates time (min) and the vertical axis indicates the electrical conductivity (μS/cm). The graph shows the results of cases in which the percentages of the cooling liquid that is made to flow through the bypass flow path 11 are 50%, 60%, 80%, and 100%. As shown in FIG. 4, as the percentage of the cooling liquid that is made to flow through the bypass flow path 11 becomes larger, the time required for the electrical conductivity to become lower than the threshold electrical conductivity is reduced. When the percentage of the cooling liquid is 80% or more, the electrical conductivity of the cooling liquid can be reduced in a short period of time.

When a pre-shipment test is performed, the electrical conductivity of the cooling liquid tends to become high. Therefore, in Step ST3, the percentage of the cooling liquid that is made to flow through the bypass flow path 11 may not be set at 100%, and the cooling liquid may be circulated also through the radiator 20. Accordingly, it is possible to definitely make the electrical conductivity of the whole cooling liquid lower than the threshold electrical conductivity. As one example, the percentage of the cooling liquid that is made to flow through the bypass flow path 11 is set at about 90%.

On the other hand, when the fuel cell system is used by the user after the shipping, the electrical conductivity of the cooling liquid does not become so high. Therefore, in Step ST3, the percentage of the cooling liquid that is made to flow through the bypass flow path 11 may be set higher than that at the time of the pre-shipment test, and may be set, for example, to 100%. Accordingly, when the fuel cell system is used by the user, ions in the cooling liquid can be removed in a shorter period of time, and the electrical conductivity can be made lower than the threshold electrical conductivity.

Next, as shown in FIG. 2, it is determined whether the electrical conductivity of the cooling liquid is lower than the threshold electrical conductivity (Step ST4). When the electrical conductivity of the cooling liquid is not lower than the threshold electrical conductivity (NO in Step ST4), Step ST4 is repeated again. That is, the cooling liquid continues to be circulated through the bypass flow path 11 until the electrical conductivity of the cooling liquid becomes smaller than the threshold electrical conductivity. On the other hand, when the electrical conductivity of the cooling liquid is lower than the threshold electrical conductivity (YES in Step ST4), the process goes to the normal start-up operation.

In the normal start-up operation, at the first stage of the start-up operation, the cooling liquid is not circulated through the radiator 20, and the cooling liquid is circulated between the bypass flow path 11 and the fuel cell FC, thereby increasing the temperature of the cooling liquid. After the temperature of the cooling liquid has increased to a predetermined temperature, the multi-way valve 40 is controlled in such a way that the cooling liquid flows through the radiator 20 as well, and thus the temperature of the cooling liquid is maintained to an appropriate temperature.

As described above, in the fuel cell system according to this embodiment, at the time of start-up after a long-time stop, the cooling liquid is circulated through the radiator 20. After that, the cooling liquid is circulated through the bypass flow path 11 at a percentage of 80% or more until the electrical conductivity of the cooling liquid becomes lower than the threshold electrical conductivity. Therefore, the cooling liquid that has been stored in the radiator 20 while the fuel cell system has stopped is mixed with another cooling liquid, the electrical conductivity of the cooling liquid is made uniform, then the cooling liquid is guided to the ion exchanger IE, and ions in the cooling liquid can be removed in a short period of time.

Note that the present disclosure is not limited to the aforementioned embodiments and may be changed as appropriate without departing from the spirit of the present disclosure.

For example, an intercooler for cooling the compressed air to be supplied to the fuel cell FC may be connected in parallel with the fuel cell FC.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:
1. A fuel cell system comprising:
    a fuel cell in which a plurality of cells are stacked;
    a radiator configured to cool a cooling liquid that has passed through the fuel cell;
    an ion exchanger provided in a bypass flow path branched off from a circulation flow path for allowing the cooling liquid to circulate between the fuel cell and the radiator;
    a multi-way valve provided in a branching point at which the bypass flow path is branched off from the circulation flow path;
    a pump which circulates the cooling liquid; and
    a controller programmed to control the multi-way valve such that a percentage of the cooling liquid that is made to flow through the bypass flow path, wherein
    in a case in which a stop time is longer than a threshold time when the fuel cell system is started up, the controller is programmed to control the multi-way valve such that all of the cooling liquid is circulated through the radiator, and then the cooling liquid is circulated through the bypass flow path at a percentage of 80% or more until an electrical conductivity of the cooling liquid becomes less than a threshold electrical conductivity, and
    wherein the percentage of the cooling liquid when it is circulated through the bypass flow path is switched in such a way that this percentage in a case in which the fuel cell system is used by a user becomes higher than that in a case in which a pre-shipment test is performed.
2. The fuel cell system according to claim 1, wherein, when the cooling liquid is circulated through the radiator, the cooling liquid is circulated halfway through the circulation flow path or more.

* * * * *